United States Patent Office 3,386,938
Patented June 4, 1968

3,386,938
ACRYLIC WAX ABRASION RESISTANT FIBER
FINISH COMPOSITION
Neil Lamar Finch, Sr., Kinston, N.C., assignor to E. I.
du Pont de Nemours and Company, Wilmington, Del.,
a corporation of Delaware
No Drawing. Filed Feb. 16, 1966, Ser. No. 527,774
1 Claim. (Cl. 260—28.5)

This invention is concerned with finishes for synthetic fibers to yield high strength cords and ropes which are resistant to wet and dry abrasion.

Ropes of synthetic fibers are well known in the art. Such ropes must be properly finished, or they will suffer from lack of resistance to dry, or, especially, wet abrasion and, lack resistance to actinic light or to oxidative degradation.

Oils and waxes have been used as finish materials for such ropes as is shown in U.S. Patent 3,113,369 to Barrett et al., U.S. Patent 3,103,448 to Rose and U.S. Patent 3,155,537 to Patterson et al. However, waxes and oils tend to exude to the surface of the rope or be squeezed out by the pressure resulting from the twist in the rope and thereby may be lost and contaminate other surfaces. Ultraviolet absorbers and antioxidants applied to the surface of the fibers along with ordinary waxes are also largely lost during the use of the rope.

The present invention provides finishes for synthetic fibers used for ropes which will adequately lubricate the fibers to provide resistance to abrasion and which will not rub off or exude out of the rope. The finishes can also be modified to protect the ropes from degradation by light and oxygen and to color the treated fibers.

These advantageous results are accomplished in accordance with the present discovery by applying to synthetic fibers a finish made from hard microcrystalline wax, soft paraffin wax, and a resin which holds the waxes on the fibers. In addition, UV light absorbers, antioxidants and coloring agents can be included to protect the fibers from light and oxygen, and to give crock-fast colored fibers.

It has been found that by using certain selected waxes and resins, finishes can be made which become fixed on the fibers. It appears that the waxes and resin form a combination which coats the fibers or penetrates the fibers in such a way that the fibers are protected from abrasion both wet and dry.

The waxes for use in this invention are a soft paraffin wax derived from petroleum and melting at about 50 to 60° C. and a hard, partially oxidized microcrystalline wax made from oxides of carbon, and hydrogen by the Fischer-Tropsch synthesis and melting at about 90 to 100° C. These and similar waxes are well known. Details on the Fischer-Tropsch synthesis are available, for example, in "Organic Chemistry" by Fieser and Fieser, 3rd edition (1956) at pages 108 and 109 and in the patent literature. These waxes generally are used in substantially equal amounts in the present finish compositions. In instances, some of the soft paraffin wax can be substituted by a high boiling mineral oil.

A third essential component is a resin of esters of acrylic or methacrylic acids with alcohols containing 1 to 10 carbon atoms per molecule. Such resins are available commercially. On a solids basis and by weight, the resin is used in an amount of one part for each 2.5 to 6 parts of the hard microcrystalline wax.

The present finish compositions are applied to the synthetic fibers as aqueous emulsions containing about 20 to 35 weight percent of "solids." A variety of commercially available emulsifying systems can be employed for emulsification including, by way of example, alkanolamine salts of phosphoric or sulfuric acid esters along with polyoxyalkylene ethers of alcohols of 6 to 20 carbon atoms per molecule of alcohol.

The finish compositions are used on filaments, continuous or discontinuous, of a synthetic linear condensation polymer such as a polyamide or poly(ethylene terephthalate). The filaments containing the finish can be used for ropes and cordage and for other end uses such as in tires or for decorative effects. When the finish is to be used on nylon, it is preferable that antioxidants and UV absorbers be included. They can also be included for polyesters, but are not essential. Typical UV absorbers that can be used include 2-hydroxy-5-methyl phenyl ether, ketone or triazole. A preferred absorber is 2(2'-hydroxy-5-methyl phenyl) benzotriazole. Other suitable benzotriazoles are disclosed in U.S. Patent 3,004,896 and in British Patents 991,204; 991,205; 991,320 and 1,002,884. As antioxidant there can be used compounds such as 2,2'-methylene bis(4-methyl-6-tertiarybutyl phenol), 2,2'-thio-bis-(4-methyl-6-tertiarybutyl phenol), ditertiary butyl-para-cresol, ditertiarybutyl catechol, propyl gallate and N-phenyl-$\alpha$-naphthylamine.

Oil-soluble colors can be included to dye the fibers any desired shade. Ropes resulting from colored finishes are attractive and also have the advantage of not showing stains as readily or as distinctly as would white ropes with no color. The oil-soluble color appears to penetrate into the fibers to the extent that they do not rub off. Colors that have been used satisfactorily are C1 Solvent Black 14, C1 Solvent Yellow 14, C1 Solvent Red 24 and C1 Solvent Blue 36. These can be used as single colors or in combination to produce a variety of shades and additional colors can be used, if desired.

Yarns to be finished with these emulsions may already contain other finishes such as spin finishes. As long as there is no more than about 0.7 percent of oil-type finishes on the yarn, the finishes of the present invention can be applied as overlay finishes. If larger quantities of oil-type finish are on the yarn some of it should be removed. This can be done by passing the yarn through a water bath.

The finish can be applied to individual yarns on a draw-winder by passing the yarn over a rotating roll dipping into the finish. Alternately, it can be applied to a mass of yarns in the form of a warp by a slashing operation followed by winding on a beam. About 1 to 3 percent of finish (water free basis) should be applied based on the dry weight of the yarn and preferably about 1.4 to 2 percent.

This finish is especially suitable for yarns of polyamides and polyesters. The filament denier is not critical nor is the cross-section shape of the filament. It is customary for cords and ropes to be made of filaments of 4 to 20 denier and 6 denier is one of the preferred sizes; and round, trilobal or hexagonal cross-section can be used.

The tenacity data reported hereinafter are obtained by a conventional Instron test. The wet and dry abrasion data are obtained as follows: Yarn is placed over a $\frac{5}{16}$ inch hexagonal bar in contact with 245° of the circumference of the bar. A 500 gram load is applied to one end of the yarn, and a lever to the other. The lever is used to move the yarn back and forth across the bar until it breaks, the cycles of lever movement being recorded. For wet abrasion, the same test is used, but the yarn is kept wet by water. When a rope is to be tested, the same test is employed. However, a standard ½ inch rope is used with a 25 pound load and a hexagonal bar having a 2 inch diameter.

The discovery will be further described in conjunction with the following examples.

Example I

A finish emulsion is prepared having the following composition, in parts by weight: 7.90 parts of "Petrolite" C–7500; 7.90 parts of "Shellwax" 100; 7.46 parts of "Brij" 76; 2.64 parts of "Gafac" GB–520; 2.93 parts of "Rhoplex" B–60–A; 0.45 part of potassium hydroxide; 0.57 part of 2(2'-hydroxy-5'-methyl phenyl)benzotriazole; 0.15 part of 2,2'-thiobis(4-methyl-6-tertiarybutyl phenol); and 70 parts of water.

"Petrolite" C–7500 is a hard, partially oxidized microcrystalline wax made by the Fischer-Tropsch synthesis from oxides of carbon, and hydrogen. It has a melting point of 96° C., a needle penetration of 25° C. of 3, a maximum color (ASTM–D–1500) of 1, an acid number of 10 to 15, and a saponification number of 25 to 35. "Shellwax" 100 is a refined soft paraffin wax from petroleum with a melting point of 52 to 55° C. and a needle penetration of 13 at 25° C. "Brij" 76 is an ether of a mol of stearyl alcohol and a mol of polyoxyethylene glycol containing 10 ethylene oxide units. It is a relatively water soluble non-ionic surfactant having a cloud point of 44° C., an acid number of 0.5 maximum, a saponification number of 2 maximum and a hydroxyl number of 78 to 86. "Gafac" GB–520 is a mixture of mono-, di- and tri-esters of phosphoric acid with an ether of oleyl alcohol and polyoxyethylene glycol with 7 ethylene oxide units. "Rhoplex" B–60–A is an aqueous emulsion of an acrylic polymer containing 46±5% solids and having a viscosity of 320 centipoises when measured on a Brookfield viscometer using a number 2 spindle, 60 r.p.m. and 25° C.

The above ingredients, except the potassium hydroxide and the "Rhoplex," are mixed and heated at 110° C.; thereafter the potassium hydroxide is added as a 45% aqueous solution while stirring. When the melt clears at 110° C., it is poured into the water, which has been heated to 95° C., with agitation to bring about emulsification. The emulsion is allowed to cool to 40° C. or lower before the "Rhoplex" is added after first diluting the "Rhoplex" with water from 46% to 15% solids. The resulting 30% emulsion is stable and can be stored for several weeks before using.

The above emulsion is applied to a 66 nylon(polyhexamethylene adipamide) yarn of 140 filaments and 840 total denier, that contains 0.7% of an oil finish made up of refined coconut oil and a sorbitol tetraoleate laurate treated with 30 mols ethylene oxide. The emulsion is applied on top of this original finish by passing the yarn over a rotating roll dipping into the emulsion. About 8% of the emulsion is picked up by the yarn which leaves about 2.5% finish on the yarn after drying. Most of the water evaporates during the winding of the yarn and no further drying is necessary.

This yarn is tested for wet abrasion resistance and found to last, on an average, for 291 abrasion cycles before failure, compared to 56 cycles for the yarn without the finish of this invention. This is a 500% improvement in wet abrasion resistance. The yarn also has a low coefficient of static friction of 0.19 compared to 0.24 for the yarn without the overlay finish.

Example II

The emulsion of Example I is applied as in Example I to a yarn melt-spun from a blend of a nylon 66 polymer (polyhexamethylene adipamide) and 6I polymer (polyhexamethylene isophthalamide) in a ratio of 87 parts 66 to 13 parts 6I. The spun yarn contains 140 filaments and has a total denier of 840. This yarn has previously been finished with a finish comprising a higher fatty acid (mixture of $C_{12}$ to $C_{20}$ acids) ester of a sorbitol-ethylene oxide condensate, coconut oil, and a low temperature reaction product of diphenylamine and acetone having a melting point of 85 to 95° C. The emulsion is applied on top of this original finish by passing the yarn over a rotating roll partly immersed in the finish emulsion.

The treated yarn is found to have a wet abrasion resistance of 141 cycles to failure compared to 29 cycles for the yarn with the original finish but not having the overlay finish of the present invention. This yarn is also low in static friction having a coefficient of 0.19 compared to 0.31 for the yarn with the original finish alone.

The yarn is twisted into cords and these then twisted into a 0.5-inch rope weighing 6.38 pounds for 100 ft. under 50 pounds stretch load. This rope is found to have a dry breaking strength of 8450 pounds compared to 6180 pounds for a rope from the yarn with only the original finish.

Example III

The emulsion finish of Example I is applied to a yarn of 1100 denier and 192 filaments spun from polyethylene terephthalate containing 0.1% $TiO_2$. This yarn has previously been finished with a mixture consisting of 98 parts of polyoxyalkylene glycol formed from equal amounts of ethylene oxide and propylene oxide and having an average molecular weight of 726, and 2 parts of an ether of a mol of nonylphenol and 8.5 mols of ethylene oxide. The treated yarn is interlaced by the process of U.S. Patent 3,110,151 to Bunting and Nelson to give a product similar to that described in U.S. Patent 2,985,995 to Bunting and Nelson. Two percent of finish (6.7% of emulsion) is applied based on the dry weight of the yarn.

This yarn is found to have a coefficient of static friction of 0.20 compared to 0.31 for a yarn containing only a spin finish.

This yarn is twisted into cords and the cords into rope of 0.5-inch diameter and weighing 7.47 pounds per 100 ft. under a stretch-load of 50 pounds. The rope has a dry breaking strength of 8,580 pounds compared to 5,796 pounds for a similar rope from yarn having only a spin finish. Compared to other controls, 10 to 12 percent increase in strength is noted.

The wet and dry abrasion resistances of this rope are 2700 cycles and 4300 cycles respectively, compared to 619 and 1748 respectively for the rope made from yarn having only a spin finish.

The antioxidant and the UV absorber can be omitted from the finish when it is to be applied to polyester yarns.

Example IV

A finish is made as in Example I except that 0.5% Cl Solvent Black 16 dye is added to the mix before it is emulsified in water. This finish is then used to finish a yarn as in Example I. A rope of the resulting yarn has a steel gray color that is fast to wet and dry crocking.

Example V

Example IV is repeated except that the following three colors are used instead of the Cl Solvent Black 16: 0.1% Cl Solvent Yellow 14 (Color Index 12055); 0.1% Cl Solvent Red 24 (Color Index 26105); 0.3% Cl Solvent Blue 36.

Rope prepared from yarn finished as in this example has an attractive light metallic gray appearance and the color is fast to wet and dry crocking.

While the discovery has been described with reference to certain details, it should be appreciated that changes can be made without departing from its scope.

What is claimed is:

1. An aqueous finish emulsion for application to yarn of synthetic fibers of a polymer of the group consisting of polyamides and polyesters, and consisting essentially of an emulsifier, about 7.9 parts by weight of a soft, paraffin wax, about 7.9 parts by weight of a partially oxidized, hard, microcrystalline wax, about 1.3 parts by weight of an acrylic resin of esters of acrylic or methacrylic acids with alcohols containing 1 to 10 carbon atoms, and about 70 parts by weight of water, the paraffin wax having a melting point of about 52° to 55° C., and a needle penetration of 13 at 25° C., the microcrystalline wax having a melting point of 96° C., a needle penetration at 25° C. of 3, an acid number of 10 to 15, and a saponification number of 25 to 35.

References Cited

UNITED STATES PATENTS

| | | |
|---|---|---|
| 3,264,136 | 8/1966 | Hedge. |
| 2,807,865 | 10/1957 | Shippe. |
| 3,201,362 | 8/1965 | Mark. |
| 3,072,492 | 1/1963 | Smith. |
| 2,695,277 | 11/1954 | Pabst. |
| 2,972,592 | 2/1961 | Brown. |

JULIUS FROME, *Primary Examiner.*